United States Patent [19]

Hiramatsu

[11] Patent Number: 4,742,732
[45] Date of Patent: May 10, 1988

[54] AUTOMATIC TRANSMISSION SYSTEM FOR A VEHICLE

[75] Inventor: Takeo Hiramatsu, Nagaokakyo, Japan

[73] Assignee: Mitsubishi Jidosha Kogyo Kabushiki Kaisha, Japan

[21] Appl. No.: 899,074

[22] Filed: Aug. 21, 1986

[30] Foreign Application Priority Data

Aug. 21, 1985 [JP]  Japan ................................ 60-183703

[51] Int. Cl.⁴ .............................................. B60K 41/18
[52] U.S. Cl. ..................................... 74/866; 364/424.1
[58] Field of Search ........................ 74/866, 868, 869; 364/424.1

[56] References Cited

U.S. PATENT DOCUMENTS

| | | | |
|---|---|---|---|
| 3,726,159 | 4/1973 | Mizote | 74/866 |
| 4,134,312 | 1/1979 | Iijima | 74/868 X |
| 4,263,826 | 4/1981 | Hartz et al. | 74/868 |
| 4,308,765 | 1/1982 | Iwanaga et al. | 74/868 X |
| 4,607,542 | 8/1986 | Sugano | 74/869 |
| 4,617,841 | 10/1986 | Sugano | 74/869 |
| 4,680,989 | 7/1987 | Sykora et al. | 74/868 X |

Primary Examiner—Dirk Wright
Attorney, Agent, or Firm—Abelman Frayne Rezac & Schwab

[57] ABSTRACT

An automatic transmission system for a vehicle which is so arranged that a medium speed ratio is first achieved and then a low speed ratio is achieved when the speed ratio is to be shifted from a high speed ratio immediately to the low speed ratio, in which, when the vehicle is running in the high speed ratio of the transmission and a selector lever is set to a position instructing a shift to the low speed ratio expecting an engine braking effect (speed reduction feeling), a hydraulic pressure to provide the same speed reduction feeling as obtained from the engine braking effect in the low speed ratio is supplied to the frictional engaging element to achieve the medium speed ratio, during a shift from the high speed ratio to the medium speed ratio.

12 Claims, 8 Drawing Sheets

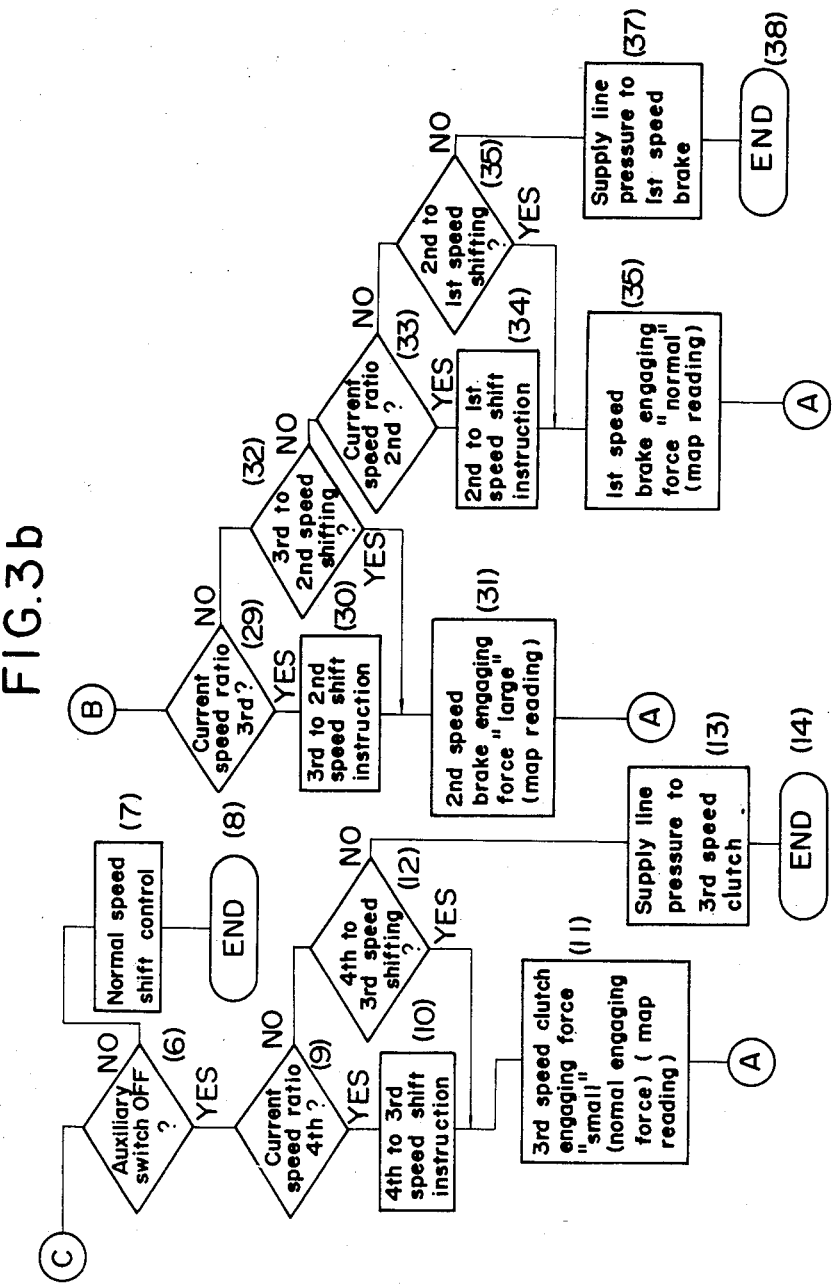

AUTOMATIC TRANSMISSION SYSTEM FOR A VEHICLE

BACKGROUND OF THE INVENTION

This invention relates to an improvement in hydraulic control devices of an automatic transmission system for a vehicle.

An automatic transmission system having at least three forward speed ratios including high, medium and low speed ratios, in which when the speed ratio is to be shifted from the high speed ratio immediately to the low speed ratio, a shift to the medium speed ratio is once achieved and then a shift to the low speed ratio is achieved has been disclosed to public, for example, by Japanese Patent Publication Laying-Open No. 101156/1982. The above automatic transmission system is designed so that an operating hydraulic pressure P0, which is to be supplied to the frictional engaging element to achieve the medium speed ratio when shifting from the high speed ratio to the low speed ratio, is supplied to the frictional engaging element to achieve the medium speed ratio during the shift from the high speed to the medium speed ratio (area (1) in FIG. 5(a)), and an operating hydraulic pressure P1, which is to be supplied to the frictional engaging element to achieve the low speed ratio when simply shifting from the medium speed ratio to the low speed ratio, is supplied to the frictional engaging element to achieve the low speed ratio during the shift from the medium speed ratio to the low speed ratio (area (2) in FIG. 5(a)), respectively, as part of the shift from the high speed ratio immediately to the low speed ratio.

Similarly, an automatic transmission system having four forward speed ratios including high, medium, low and extra-low speed ratios, in which when the speed ratio is to be shifted from the high speed ratio immediately to the extra-low speed ratio, shifts to the medium and low speed ratios are once achieved and then a shift to the extra-low speed ratio is achieved, has been designed so that operating hydraulic pressures P'0, P'1 and P'2 to achieve the medium speed ratio during the shift from the high speed ratio to the medium speed ratio, the low speed ratio during the shift from the medium speed ratio to the low speed ratio, and the extra-low speed ratio during the shift from the low speed ratio to the extra-low speed ratio, respectively, are supplied to frictional engaging elements to achieve the lower speed ratios during the shift from the high speed ratio to the medium speed ratio (area (1) in FIG. 5(b)), the shift from the medium speed ratio to the low speed ratio (area (2) in FIG. 5(b)), and the shift from the low speed ratio to the extra-low speed ratio (area (3) in FIG. 5(b)), respectively, as parts of the shift from the high speed ratio immediately to the extra-low speed ratio.

Therefore, in a vehicle with an automatic transmission system having at least three forward speed ratios, running in the high speed ratio of the transmission, even if the driver shifts a conventional selector lever to a position where the low speed ratio is to be immediately achieved in order to reduce the running speed of the vehicle, expecting an immediate strong engine braking effect in the low speed ratio of the transmission, the driver will first feel, as shown in the curve of output shaft torque of transmission vs. time in FIGS. 5(a)-(i), a weak engine braking effect that is generated during a shift from the high speed ratio to the medium speed ratio (area (i)), and after a period of time feel an engine braking effect of a strength as expected (area (2)). Therefore, the conventional automatic transmission system has been defective, amongst others, in that an engine braking effect of expected strength cannot be obtained immediately and this causes the driver to be uneasy on the effect of engine brake.

Similarly, in a vehicle with an automatic transmission system having at least four forward speed ratios, running in the high speed ratio of the transmission, even if the driver shifts a conventional art selector lever to a position where the extra-low speed ratio is immediately achieved in order to reduce the running speed of the vehicle, expecting an immediate strong engine braking effect in the extra-low speed ratio of the transmission, the driver will first feel, as shown in the curve of output shaft torque of transmission vs. time in FIGS. 5(b)-(ii), a weak engine braking effect that is generated during a shift from the high speed ratio to the medium speed ratio (area (1)), secondly an engine braking effect that is generated during a shift from the medium speed ratio to the low speed ratio (area (2)), and then an engine braking effect of a strength as expected (area (3)). Therefore, the conventional automatic transmission system has been defective, among others, in that an engine braking effect of expected strength cannot be obtained immediately and this causes the driver to be uneasy on the effect of engine brake.

SUMMARY OF THE INVENTION

With a view to improve such a conventional situation, it is a primary object of the present invention to provide an automatic transmission system for a vehicle in which all of the conventional defects are eliminated.

In accordance with the present invention which attains the above object, there is provided an automatic transmission system for a vehicle comprising a gear mechanism for providing three speed ratios including high, medium, and low speed ratios between an input shaft and an output shaft by selectively engaging a plurality of frictional engaging elements operated by hydraulic pressure, a hydraulic pressure source for generating a predetermined hydraulic pressure, a hydraulic pressure selecting device capable of selectively supplying hydraulic pressure from the hydraulic pressure source to the frictional engaging element to achieve one of the speed change ratios, a hydraulic pressure control device for controlling hydraulic pressure to be supplied to the frictional engaging elements to achieve the medium and low speed ratios disposed between the hydraulic pressure source and the frictional engaging elements to achieve the medium and low speed ratios, and an electronic control device for controlling the hydraulic pressure selecting device and the hydraulic pressure control device, in which the medium speed ratio is once achieve and then the low speed ratio is achieved when vehicle speed is to be shifted from the high speed ratio immediately to the low speed ratio, the electronic control device having a first means for controlling the hydraulic pressure control device so that a first hydraulic pressure is supplied to the frictional engaging element to achieve the medium speed ratio when vehicle speed is to be shifted simply from the high speed ratio to the medium speed ratio, and a second means for controlling the hydraulic pressure control device so that a second hydraulic pressure higher than the first hydraulic pressure is supplied to the frictional engaging element to achieve the medium speed ratio during a shift from the high speed ratio to the medium speed ratio when vehicle speed is to be shifted from the high speed ratio immediately to the low speed ratio.

The present invention provides another automatic transmission system for a vehicle comprising a gear mechanism for providing at least four speed ratios including high, medium, low and extra-low speed ratios between an input shaft and an output shaft by selectively engaging a plurality of frictional engaging elements operated by hydraulic pressure, a hydraulic pressure source for generating a predetermined hydraulic pressure, a hydraulic pressure selecting device capable of selectively supplying hydraulic pressure from the hydraulic pressure source to the frictional engaging element to achieve one of the speed ratios, a hydraulic pressure control device for controlling hydraulic pressure to be supplied to the frictional engaging elements to achieve the medium, low, and extra-low speed ratios disposed between the hydraulic pressure source and the frictional engaging elements, and an electronic control device for controlling the hydraulic pressure selecting device and the hydraulic pressure control device, in which the medium and low speed ratios are once achieved and then the extra-low speed ratio is achieved when vehicle speed is to be shifted from the high speed ratio immediately to the extra-low speed ratio, the electronic control device having a first means for controlling the hydraulic pressure control device so that a first hydraulic pressure is supplied to the frictional engaging element to achieve the medium speed ratio when vehicle speed is to be shifted simply from the high speed ratio to the medium speed ratio and that a second hydraulic pressure is supplied to the frictional engaging element to achieve the low speed ratio when vehicle speed is to be shifted simply from the medium speed ratio to the low speed ratio, and a second means for controlling the hydraulic pressure control device so that a third hydraulic pressure higher than the first hydraulic pressure is supplied to the frictional engaging element to achieve the medium speed ratio during a shift from the high speed ratio to the medium speed ratio and that a fourth hydraulic pressure higher than the second hydraulic pressure is supplied to the frictional engaging element to achieve the low speed ratio during a shift from the medium speed ratio to the low speed ratio when vehicle speed is to be shifted from the high speed ratio immediately to the extra-low speed ratio.

By virtue of such an arrangement of the automatic transmission system having at least three speed change ratios including high, medium and low speed ratios, which is designed so that the frictional engaging element to achieve the medium speed ratio is supplied with a hydraulic pressure higher than that to be supplied to the frictional engaging element during a shift simply from the high speed ratio to the medium speed ratio when vehicle speed is to be shifted from the high speed ratio immediately to the low speed ratio, when the driver shifts the selector lever to a position where the low speed ratio is immediately achieved in order to reduce the vehicle speed, a strong engine braking effect is obtained by a rapid reduction in torque of the output shaft during the shift from the high speed ratio to the medium speed ratio. Thus, a sufficient engine braking effect that is expected by the driver is immediately obtained, thereby eliminating driver's uneasiness on the engine brakine effect.

Similarly, with an automatic transmission system having at least four speed change ratios including high, medium, low and extra-low speed ratios, which is designed so that, when vehicle speed is to be shifted from the high speed ratio immediately to the extra-low speed ratio, first the frictional engaging element to achieve the medium speed ratio is supplied with a hydraulic pressure higher than that to be supplied to the frictional engaging element during a shift simply from the high speed ratio to the medium speed ratio, and that the frictional engaging element to achieve the low speed ratio is supplied with a hydraulic pressure higher than that to be supplied to the frictional engaging element during a shift simply from the medium speed ratio to the low speed ratio, when the driver shifts the selector lever to a position where the extra-low speed ratio is immediately achieved in order to reduce the vehicle speed, a rapid reduction in torque of the output shaft is obtained during the shift from the high speed ratio to the medium speed ratio and the shift from the medium speed ratio to the low speed ratio, thereby obtaining a strong engine braking effect. Thus, a sufficient engine braking effect that is expected by the driver is immediately obtained, thereby eliminating driver's uneasiness on the engine braking effect. At the same time, variation in output shaft torque during the down-shift operation can be reduced while maintaining the strong engine braking effect.

BRIEF DESCRIPTION OF THE DRAWINGS

FIGS. 3(a) and 3(b) are a flow chart for explaining the control process of the embodiment according to the present invention.

DESCRIPTION OF THE PREFERRED EMBODIMENTS

Preferred embodiments of the present invention will now be described in detail with reference to the drawings.

Figure 1:
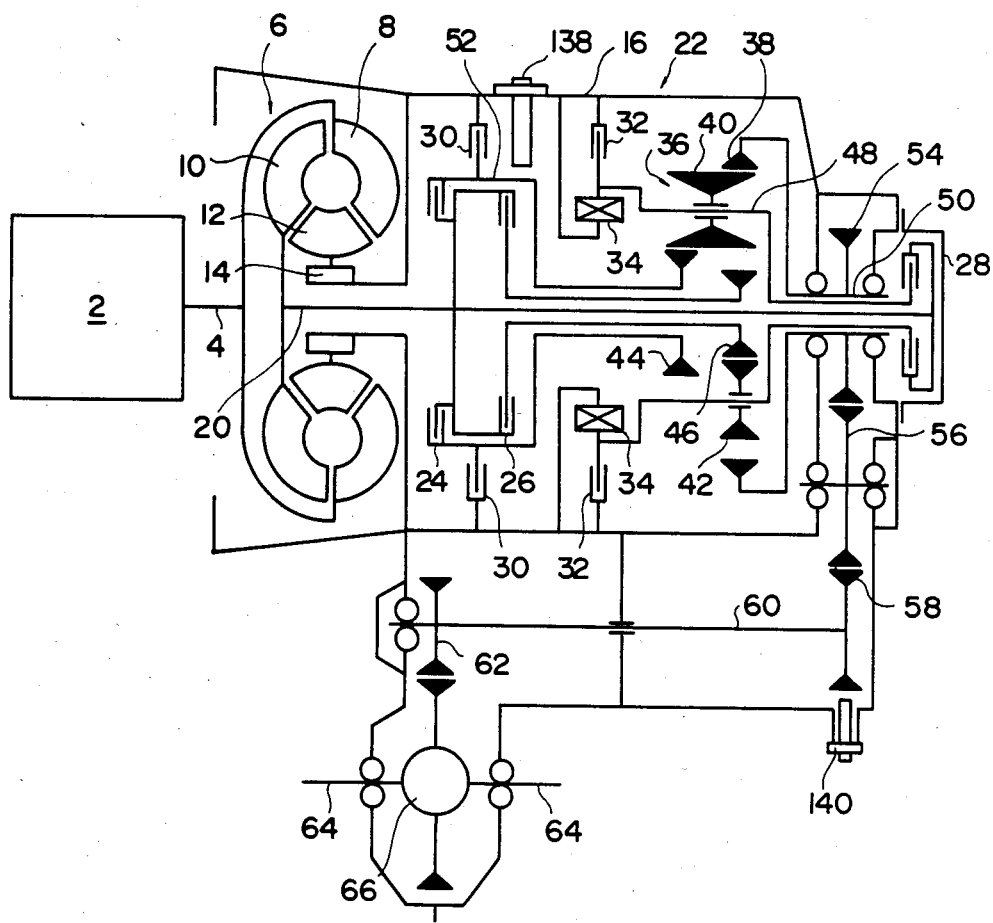
FIG. 1 is a schematic view showing a power train of an automatic transmission system for vehicle to which an embodiment of the present invention is applied.

Referring now to FIG. 1, an engine 2 providing a power source for driving a vehicle is directly coupled at its crankshaft 4 to a pump 8 of a torque converter 6. The torque converter 6 includes the pump 8, a turbine 10, a stator 12 and a one-way clutch 14. The stator 12 is coupled to a casing 16 through the one-way clutch 14. The stator 12 is so arranged that it can rotate in the same direction as the crankshaft 4 but is not permitted to rotate in the opposite direction by the function of the one-way clutch 14.

The torque transmitted to the turbine 10 is then transmitted by an input shaft 20 to a speed change gear assembly 22 which is disposed behind the torque converter 6 and which provides four forward speeds and one reverse speed. The speed change gear assembly 22 includes three clutches 24, 26, 28, two brakes 30, 32, one one-way clutch 34, and one ravigneaux type planetary gear set 36. The planetary gear set 36 includes a ring gear 38, a long pinion gear 40, a short pinion gear 42, a front sun gear 44, a rear sun gear 46, and a carrier 48. The carrier 48 rotatably supports the two pinion gears 40 and 42 and is also rotatable around its own axis. The ring gear 38 is coupled to an output shaft 50, and the front sun gear 44 is coupled to the input shaft 20 through a kickdown drum 52 and the front clutch 24. The rear sun gear 46 is coupled to the input shaft 20 through the rear clutch 26. The carrier 48 is coupled to the casing 16 through the low reverse brake 32 and the one-way clutch 34 which are arranged to be functionally parallel to each other. The carrier 48 is also coupled to the input shaft 20 through the 4th speed clutch 28 disposed in the rear end of the speed change gear assembly 22. The kickdown drum 52 can be fixedly coupled to the casing 16 by the kickdown brake 30.

The torque transmitted through the planetary gear set 36 is transmitted from an output gear 54 fixed to the output shaft 50 to a driven gear 64 via an idle gear 56, and, thence, transmitted via a transfer shaft 60 to which the driven gear 64 is fixed and via a helical gear 62 to a differential gear unit 66 to which a driving shaft 64 is coupled.

Figure 2:
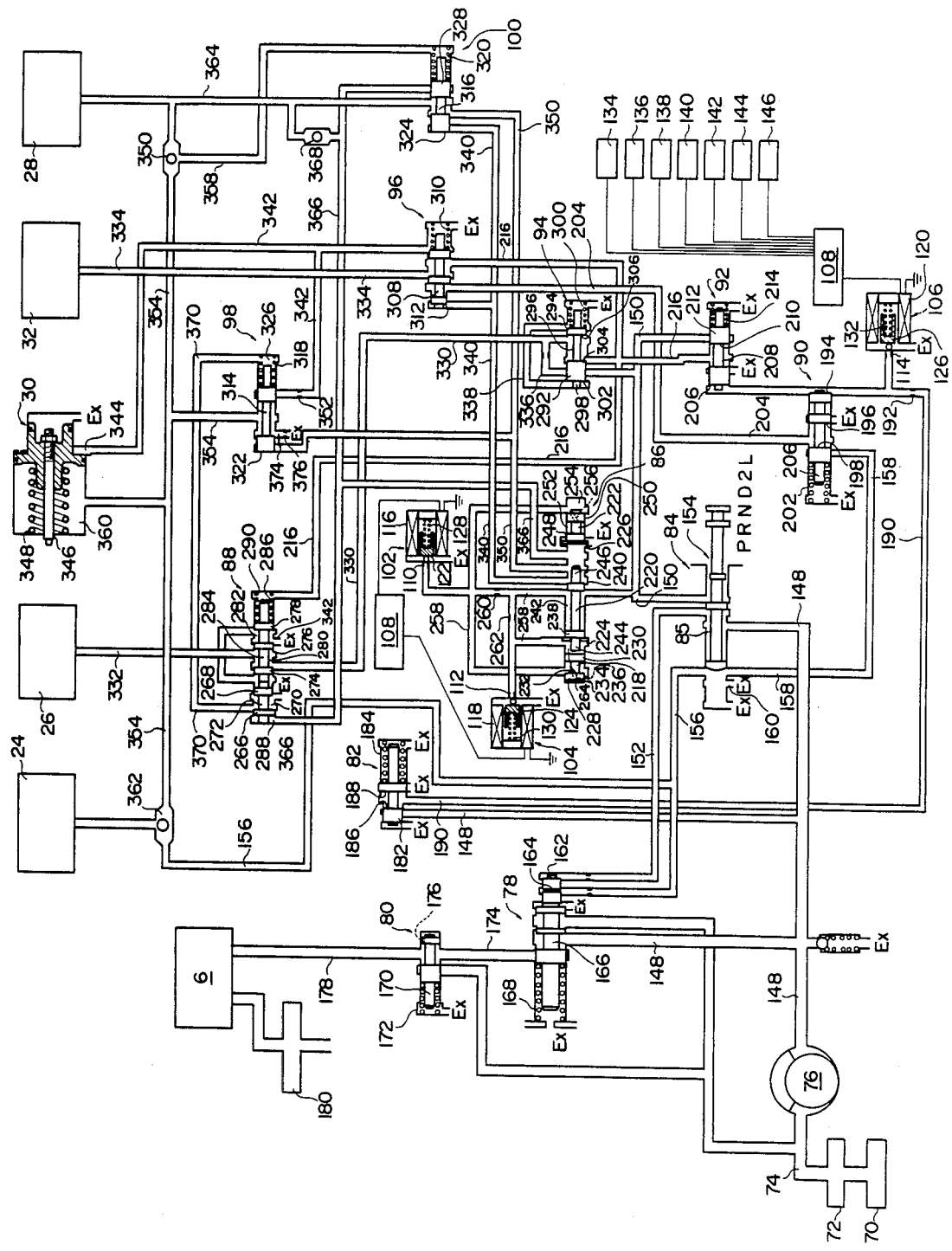
FIG. 2 is a circuit diagram showing a hydraulic pressure control device of the automatic transmission system for vehicle according to the present invention.

The individual clutches and brakes described above are arranged in the form of frictional engaging elements including engaging piston units, servo units or the like respectively and are actuated by a hydraulic pressure generated at an oil pump 68 which is shown in FIG. 2. The oil pump 68 is driven from the engine 2 through the pump 8 of the torque converter 6. The hydraulic pressure is selectively supplied, under control of a hydraulic pressure control device, described later, to the individual clutches and brakes in dependence on setting of a selector lever, which is not shown, at the driving seat, operation of auxiliary switches to select a D4 or D3 condition, described later, and driving condition of the vehicle detected by various driving condition detectors or sensors, so that combinations of the operations of the individual clutches and brakes achieve speed ratios of four forward speeds and one reverse speed.

Select patterns that can be selected by operating the selector lever to select six positions, P, R, N, D, 2, and L, include P (parking), R (reverse), N (neutral), D4 (automatic speed change among four forward speeds), D3 (automatic speed change among three forward speeds), 2 (automatic speed change among two forward speeds), and L (1st speed fixed). With the selector lever set to the D position, either D3 or D4 position is selected by operating the auxiliary switch. Table 1 shows the operations of the individual clutches and brakes and the speed change situation for the above individual select patterns. In the table, the symbol    indicates that the corresponding clutch or brake is engaged, while the symbol    indicates that the rotation of the carrier 48 is locked by the function of the one-way clutch 34 immediately before the low reverse clutch 32 is engaged for shifting operation.

TABLE 1

| Select pattern | P | R | N | D4 | | | | D3 | | | 2 | | L | |
|---|---|---|---|---|---|---|---|---|---|---|---|---|---|---|
| Speed | — | R | — | 1st | 2nd | 3rd | 4th | 1st | 2nd | 3rd | 1st | 2nd | 1st | 2nd |
| Frictional engaging element | o | | | | o | | | | o | | | | | |
| Clutch 24 | | | | o | o | o | | o | o | o | o | o | o | o |
| Clutch 26 | | | | | | | | | | | | | | |
| Brake 30 | | | | .o | | o | | o | | | o | o | | |
| Brake 32 | | o | | | | | | | | | | o | | |
| Clutch 34 | | ◉ | | | | | ◉ | | | o | | | | |
| Clutch 28 | | | | | o | o | | | o | | | | | |

Hydraulic pressure control and electronic control provided for achieving the speed ratios shown in Table 1 in the speed change gear assembly 22 shown in FIG. 1 will now be described.

The hydraulic pressure pumped out from an oil sump 70 and discharged from the oil pump 76 flows through an oil filter 72 and a fluid passage 74 to be supplied to the torque converter 6 and to individual fluid chambers of the piston units or servo units of the clutches 24, 26, 28 and brakes 30, 32 of the speed change gear assembly 22. The hydraulic pressure control device shown in FIG. 2 controls the hydraulic pressure supplied to the fluid chambers depending on the driving condition of the vehicle. The hydraulic pressure control device includes, as its principal components, a pressure regulating valve 78, a torque converter control valve 80, a pressure reducing valve 82, a manual valve 84, a shift control valve 86, a rear clutch control valve 88, an N-R control valve 90, a hydraulic pressure control valve 92 for speed shifting, and N-D control valve 94, a 1st-2nd speed shift valve 96, a 2nd-3rd speed and 4th-3rd speed shift valve 98, a 4th speed clutch control valve 100, and three electromagnetic valves 102, 104, and 106. These components are connected to one another by fluid passages.

The electromagnetic valves 102, 104, and 106 have the same structure and are of the type closed when de-energized, for effecting open-close control of associated orifices 110, 112 and 114 in response to an electrical signal applied from the electronic control device 108, and include coils 116, 118 and 120, valve members 122, 124 and 126 disposed in the coils for opening and closing the orifices 110, 112 and 114 and springs 128, 130 and 132 urging the valve members in the closing direction, respectively.

The electronic control device 108 contains units such as a shift detecting device for detecting starting of a speed shift, and controls on-off of the electromagnetic valves 102, 104 and 106 and also the hydraulic pressure by controlling the valve opening period in one cycle by varying the single pulse width of the pulse current of several tens of Hertz supplied to the electromagnetic valve 106. Input elements applying inputs to the electronic control device 108 include a valve opening sensor 134 detecting the opening of the throttle valve (not shown) of the engine 2, an engine rotation speed sensor 136 detecting the rotation speed of the engine 2, a drum rotation speed sensor 138 detecting the rotation speed of the kickdown drum 52 shown in FIG. 1, a gear rotation speed sensor 140 detecting the rotation speed of the driven gear 58 thereby detecting the rotation speed of the output shaft 50 corresponding to the vehicle speed, and oil temperature sensor 142 detecting the temperature of lubricating oil, a select position sensor 144 detecting the selected position of the selector lever, and an auxiliary switch 146 selecting the select pattern D4 or D3.

Pressurized oil discharged from the oil pump 76 is supplied to the pressure regualting valve 78, the manual valve 84 and the pressure reducing valve 82 via a fluid passage 148.

The manual valve 84 has a spool valve 85 which is capable of selecting six positions, i.e. L, 2, D, N, R and P. When the position L, 2 or D is selected, the fluid passage 148 communicates with fluid passages 150 and 152 so that the speed change gear assembly 22 can achieve the 1st to 4th forward speed ratios depending on the on-off combination of the electromagnetic valves 102 and 104 as described later. When the N position is selected, the fluid passage 148 communicates with the fluid passage 152 only, and the fluid passage 150 communicates with an oil outlet port 154, so that the neutral state is established in the speed change gear assembly 22. With the R position selected, the fluid passage 148 communicates with fluid passages 156 and 158 so that the rearward speed ratio can be established in the speed change gear assembly 22. At the P position, all the fluid passages communicating with the manual valve 84 communicate now with the oil outlet port 154 or 160 so that the speed change gear assembly 22 is placed substantially in a neutral state.

The pressure regulating valve 78 includes a spool 166 having pressure receiving surfaces 162 and 164, and a spring 168. When the hydraulic pressure supplied from the fluid passage 148 through the fluid passage 152 acts upon the pressure receiving surface 162, the hydraulic pressure in the fluid passage 148 is regulated to a predetermined constant pressure of 6 kg/cm$^2$ (hereinafter referred to as line pressure). On the other hand, when the hydraulic pressure supplied from the fluid passage 148 through the fluid passage 156 acts upon the pressure receiving surface 152, the hydraulic pressure in the fluid passage 148 is regulated to another predetermined constant value of 14 kg/cm$^2$.

The torque converter control valve 80 includes a spool 170 and a spring 172, and hydraulic pressure is supplied from the pressure regulating valve 78 via a fluid passage 174. By the balance between the hydraulic pressure acting on the right-hand pressure receiving surface of the spool 170 by flowing through a fluid passage 176 on the spool 170 and the biasing force of the spring 172, the hydraulic pressure is regulated to a predetermined value of 3 kg/cm$^2$ to be supplied to the torque converter 6 via a fluid passage 178. Oil discharged from the torque converter 6 is supplied through an oil cooler 180 to various lubricating parts of the speed change gear assembly 22.

The pressure reducing valve 82 includes a spool 182 and a spring 184. By the balance between the hydraulic pressure due to the area difference between opposing pressure receiving surfaces 186 and 188 formed on the spool 182 and the biasing force of the spring 184, the hydraulic pressure from the fluid passage 148 is reduced and regulated to a predetermined value of 2.4 kg/cm$^2$ to be supplied into a fluid passage 190. The regulated hydraulic pressure (reduced hydraulic pressure) is supplied from the fluid passage 190 to the N-R control valve 90, the hydraulic pressure control valve 92 and the orifice 114 of the electromagnetic valve 106 via an orifice 192.

The N-R control valve 90 includes a spool 200 formed with pressure receiving surface 194, 196 and 198, and a spring 202. By the balance between the hydraulic pressure acting on the pressure receiving surface 194 and the combination of the hydraulic pressure due to the area difference between the pressure receiving surfaces 196 and 198 and the biasing force of the spring 202, the hydraulic pressure in a fluid passage 204 is regulated to a desired value.

The hydraulic pressure control valve 92 includes a spool 212 formed with pressure receiving surfaces 206 and 208, and a spring 214. By the balance between the hydraulic pressure acting on the pressure receiving surface 206 and the combination of the hydraulic pressure due to the area difference between the pressure receiving surfaces 208 and 210 and the biasing force of the spring 214, the hydraulic pressure in a fluid passage 216 is regulated to a desired value.

The hydraulic pressure thus regulated and supplied to the fluid passage 204 controls the low reverse brake 32 at the time of shifting to the reverse speed ratio. The hydraulic pressure regulated and supplied to the fluid passage 216 controls the front clutch 24, the rear clutch 26, the kickdown brake 30 and the low reverse brake 32 when the vehicle is in the forward driving condition or is halted.

The electromagnetic valve 106 is duty-controlled by the electronic control device 108. The ratio of opening and closure of the orifice 114 is changed by changing the proportion of the pulse width in one cycle of a constant-frequency pulse current of several tens of Hertz so as to control the hydraulic pressure in a fluid passage 190 downstream of the orifice 192, that is, to control a signal hydraulic pressure P1 acting on the pressure receiving surface 194 of the N-R control valve 90 and on the pressure receiving surface 206 of the hydraulic pressure control valve 92. For example, with the orifice 192 of 0.8 mm in diameter and the orifice 114 of 1.4 mm in diameter, the signal hydraulic pressure P1 can be regulated between about 0.3 and 2.1 kg/cm$^2$, and accordingly the hydraulic pressure generated in the fluid passages 204 and 216 increases or decreases between about 0 kg/cm$^2$ and the supply hydraulic pressure (hydraulic pressure in the fluid passage 158 or 150) in a relation proportional to the increase or decrease in the signal hydraulic pressure P1.

The operation starting timing and operation duration of the electromagnetic valve 106 are determined according to electrical signals from the throttle valve opening sensor 134, the rotation speed sensors 136, 138, 140, the shift detecting device disposed in the electronic control device 108, and a engaging timing detecting device consisting of the rotation speed sensors 138 and 140.

The shift control valve 86 is controlled by the combination of the on-off states of the electromagnetic valves 102 and 104. The shift control valve 86 includes three spools 218, 220 and 222 and two stoppers 224 and 226. The spool 218 is formed with lands 228 and 230, an annular groove 232, and a fluid passage 236 through which the annular groove 232 communicates with a fluid chamber 234 on the left-hand side of the land 228. The spool 220 is formed with lands 238 and 240 of different diameters, an annular groove 242, and pressing portions 244 and 246 abuttable with the spools 218 and 222. The spool 222 is formed with lands 248 and 250, an annular groove 252, and a fluid passage 256 through which the annular groove 252 communicates with a fluid chamber 254 on the right-hand side of the land 250. The stopper 224 is interposed between the spools 218 and 220 and is fixed to the casing. The stopper 226 is interposed between the spools 220 and 222 and is fixed to the casing.

The fluid passage 150 communicates always with a fluid passage 258 through the annular groove 242. This fluid passage 258 communicates through an orifice 260 with the orifice 110, the left-hand fluid chamber 234 and the right-hand fluid chamber 254 and communicates also through an orifice 262 with the orifice 112 and a fluid chamber 264 defined between the spools 218 and 220. The relationship between the combinations of the on-off states of the electromagnetic valves 102 and 104 and the speed change ratios is shown in Table 2.

TABLE 2

| Speed | Electromagnetic valve 102 | Electromagnetic valve 104 |
| --- | --- | --- |
| 1st | ON | ON |
| 2nd | OFF | ON |
| 3rd | OFF | OFF |
| 4th | ON | OFF |

The rear clutch control valve 88 includes a spool 272 formed with a land 266, another land 268 having a diameter smaller than that of the land 266, and an annular groove 270; a spool 284 formed with three lands 274, 276 and 278 having the same diameter as that of the land 268, and annular grooves 280 and 282; and a spring 286. When the pressing force of the hydraulic pressure introduced into a left-hand fluid chamber 288 in FIG. 2 to act on the pressure receiving surface of the land 266 exceeds the combination of the pressing force of the hydraulic pressure introduced into a right-hand fluid chamber 290 in FIG. 2 to act on the pressure receiving surface of the land 278 and the biasing force of the spring 286, the two spools 272 and 284 are urged to their rightmost positions in FIG. 2. When the spools 272 and 284 are brought to such positions, the hydraulic pressure acts between the lands 268 and 274, so that, when the hydraulic pressure in the fluid chamber 288 is then discharged, the spool 272 alone is urged leftward in FIG. 2. Thereafter, the spool 284 is urged leftward when the pressing force of the hydraulic pressure acting on the left-hand pressure receiving surface of the land 274 becomes smaller than the combination of the pressing force of the hydraulic pressure in the fluid chamber 290 and the biasing force of the spring 286.

The N-D control valve 94 includes a spool 298 formed with lands 292 and 294, and an annular groove 296, and a spring 300. Depending on the direction of the combination force of the hydraulic pressure acting on the pressure receiving surfaces 302, 304 and 306 and the biasing force of the spring 300, the spool 298 is selectively changed over between the leftmost postion shown in FIG. 2 and the rightmost position (not shown).

The 1st-2nd speed shift valve 96 includes a spool 308 and a spring 310. Depending on whether or not the line pressure acts on a left-hand pressure receiving surface 312 of the spool 308, the spool 308 is changed over between the leftmost position shown in FIG. 2 and the rightmost position (not shown). Thus, when the line pressure is supplied to on the pressure receiving surface 32, the spool 308 is urged to its rightmost position by the force of the line pressure, while, when the line pressure is exhausted, the spool 308 is urged to its leftmost position by the biasing force of the spring 310.

The 2nd-3rd and 4th-3rd speed shift valve 98 and the 4th speed clutch control valve 100 similarly include spools 314 and 316, and springs 318 and 320, respectively. Fluid chambers 322 and 324 into which the line pressure is introduced are formed on the left-hand side of the spools 314 and 316, respectively, and fluid chambers 326 and 328 are formed on the right-hand side of the spools 314 and 316, respectively. In each of the valves 98 and 100, the spool is selectively changed over between the leftmost position shown in FIG. 2 and the rightmost position (not shown).

Speed shift control by selective engagement in the individual frictional engaging elements will now be described.

When the driver of the vehicle sets the auxiliary switch to the D4 position, and operates the selector lever (not shown) to set the spool 85 of the manual valve 84 to the D position, the line pressure regulated at a pressure of 6 kg/cm² in the fluid passage 148 is introduced into the fluid passage 150, and the line pressure in the fluid chamber is then introduced to the shift control valve 86. At this moment, if both the electromagnetic valves 102 and 104 are are in their energized state, both the orifice 110 and 112 are released. Hence, the hydraulic pressure in the individual fluid chambers 234, 254 and 264 does not increase, and the spool 220 is urged to its leftmost position by the hydraulic pressure due to the area difference between the pressure receiving surfaces of the lands 238 and 240. Thus, the line pressure will not be introduced into any other fluid chambers connected to the shift control valve 86.

The line pressure in the fluid passage 150 is introduced into the rear clutch 26 through the hydraulic pressure control valve 92, the fluid passage 216, the N-D control valve 88, a fluid passage 330, the rear clutch control valve 88, and a fluid passage 332 thereby achieving the speed shift to the 1st speed ratio.

During the above shift, sharp rise in the hydraulic pressure in the hydraulic pressure chamber of the rear clutch 26 is prevented by the function of the hydraulic pressure control valve 92 thereby reducing speed shift shock.

The operation of the N-D control valve 94 during the above shift will be described. When the hydraulic pressure is introduced from the fluid passage 216 to the annular groove 296, the spool 298 is urged to the right-hand side in FIG. 2 against the biasing force of the spring 300 by the hydraulic pressure due to the area difference between the pressure receiving surfaces 304 and 306. As a result, communication is blocked between the fluid passages 216 and 330, and the fluid passage communicates with the fluid passage 330 through a fluid passage 336 and also with a fluid passage 338. Therefore, as far as the manual valve is maintained at the D position, the fluid passage 150 communicates with the fluid passage 330 not through the hydraulic pressure control valve 92. Thus, the hydraulic pressure applied to the hydraulic pressure chamber of the rear clutch 26 is not affected by the hydraulic pressure reduction control of the hydraulic pressure control valve 92 during the shift, thereby preventing shift shock due to slip in the rear clutch 26 and eventual run up of the engine.

In the state in which the manual valve 84 is maintained at the D position and the spool is urged rightward in FIG. 2, the electromagnetic valve 106 is actuated at a 100% duty ratio, that is, the hydraulic pressure in the fluid passage 190 is completely exhausted flowing through the orifice 114. As a result, the spool 212 is urged leftward in FIG. 2. Therefore, no hydraulic pressure is applied to the low reverse brake 32, and the driving force from the input shaft 20 is transmitted to the driving wheels by the function of the one-way clutch 34 shown in FIG. 1, but the driving force from the driving shaft 64 is not transmitted to the input shaft 20 (no engine braking is effected) thereby achieving the speed shift to the 1st speed ratio.

When the accelerator pedal is further depressed in such a state to increase the speed of the vehicle, a 2nd speed shift instruction signal is generated from the electronic control device 108 in accordance with signals from the valve opening sensor 134 and the gear rotation speed (vehicle speed) sensor 140, with the result that the electromagnetic valve 102 is de-energized, while the electromagnetic valve 104 remains energized. As a result, the line pressure in the fluid passage 258 is introduced into the annular groove 232, the fluid passage 236, the fluid chambers 234 and 254, and the annular groove 252, and the spool 218 is moved together with the spool 220 rightward in FIG. 2 until the movement of the spool 218 is stopped by abutting on the stopper 224. The line pressure in the fluid passage 150 is introduced into a fluid passage 340 through the annular groove 242, and the line pressure acts on the pressure receiving surface 312 of the 1st-2nd speed shift valve 96 and the pressure receiving surface 324 of the 4th speed clutch control valve 100 to urge the spools 308 and 316 of the valves 96 and 100 toward their rightmost positions. Consequently, the line pressure in the fluid passage 216 is supplied to an engaging-side fluid chamber 344 of the kickdown brake 30 through a fluid passage 342. A rod 346 is urged leftward against the force of the spring 348 thereby causing engagement of the brake band (not shown) with the kickdown drum 52. At this time, the hydraulic pressure control valve 92 reduces the hydraulic pressure in the fluid passage 216, that is, the hydraulic pressure supplied to the fluid chamber 344 of the kickdown brake 30, in accordance with the hydraulic pressure control of the electromagnetic valve 106 during the speed shift, thereby preventing the speed shift shock.

When both the electromagnetic valves 102 and 104 are de-energized by the instruction from the electronic control device 108 to achieve the speed shift to the 3rd speed ratio, the line pressure is supplied to the fluid chamber 264 through the orifice 262, and the spool 220 is moved rightward in FIG. 2 by the line pressure acting on the pressure receiving surface of the land 238 until the movement of the spool 220 is stopped by abutting on the spool 222 thereby the fluid passage 150 communicating with à fluid passage 350. The line pressure introduced into the fluid passage 350 acts on the pressure receiving surface 322 of the 2nd-3rd and 4th-3rd speed shift valve 98 to move the spool 314 of the 2nd-3rd and 4th-3rd speed shift valve 98 to the rightmost position thereby the fluid passage 342 communicating with a fluid passage 354 through an orifice 352. The hydraulic pressure introduced into the fluid passage 354 is supplied to the fluid chamber 328 through a select valve 356 and a fluid passage 358 and to the front clutch 24 through a releasing-side fluid chamber 360 of the kickdown brake 30 and a select valve 362. By virtue of the arrangement in which the fluid passage 354 communicates with the releasing-side fluid chamber 360 of the kickdown brake 30 and the front clutch 24, the engaging and releasing actions of the kickdown brake 30 and the front clutch 24 take place overlapping each other.

During the speed shift from the 2nd speed ratio to the 3rd speed ratio, the hydraulic pressure control valve 92 also operates to maintain the hydraulic pressure in the fluid passage 216 at a reduced value for a short period of time as in the speed shift from the 1st speed ratio to the 2nd speed ratio. The orifice 352 is interposed in the fluid passage 342 communicating with the fluid passage 216, and the hydraulic pressure in the releasing-side hydraulic pressure chamber 360 of the kickdown brake 30 and in the fluid chamber of the front clutch 24 is maintained at the same low hydraulic pressure by the function of the orifice 352 during the operation of the hydraulic pressure control valve 92 thereby engaging the front clutch 24 together with releasing the kickdown brake 30. After that, when the operation of the hydraulic pressure control valve is stopped and the hydraulic pressure increases to 6 kg/cm², engagement of the front clutch 24 is achieved thereby achieving the speed shift to the 3rd speed ratio. In this case, the rotation speed of the input shaft 20 and the kickdown drum 52 approaches and coincides with that of the output shaft 50, and the state of the coincidence or immediately before the coincidence is detected as completion of the speed shift by the rotation speed sensors 138 and 142. Upon detection of the completion of the speed shift, the operation of the hydraulic pressure control valve, i.e. the operation of the electromagnetic valve 106, is stopped to increase the supply hydraulic pressure to the front clutch 24 to 6 kg/cm². By the increase of the hydraulic pressure, the hydraulic pressure in the fluid chamber 328 of the 4th speed clutch control valve 100 is also increased, and the spool 316 is moved to the leftmost position in FIG. 3 to supply the line pressure in the fluid passage 350 to the 4th speed clutch 28 through a fluid passage 364 thereby achieving engagement of the 4th speed clutch 28.

The fluid passage 364 communicates with a fluid passage 358 and the fluid chamber 328 through the select valve 356. After the line pressure is once supplied to the fluid passage 364, the spool 316 of the 4th speed clutch control valve 100 is maintained at the leftmost position in FIG. 2 until the line pressure is exhausted from the fluid passage 364, thus preventing releasing or slipping of the 4th speed clutch 28 causing impossibility of speed shift or shifting in the neutral state during the speed shift from the 3rd to the 4th speed ratio.

When the electromagnetic valve 102 is energized and the electromagnetic valve 104 is de-energized to achieve the speed shift to the 4th speed ratio by the instruction from the electronic control device 108, the hydraulic pressure in the fluid chambers 234 and 254 of the shift control valve 86 decreases, the spool 222 together with the spool 220 moves rightward to the rightmost position in FIG. 2. As a result, the line pressure in the fluid passage 150 is introduced into the fluid chamber 288 of the rear clutch control valve 88 through a fluid passage 366 and into the fluid passage 364 through a check valve 368. The spools 272 and 284 of the rear clutch valve 88 are moved to the rightmost position in FIG. 2 by the line pressure supplied to the fluid chamber 288, the fluid passage 366 communicates with a fluid passage 370, and the line pressure is supplied to the fluid chamber 326 of the 2nd-3rd and 4th-3rd speed shift valve 98, thereby moving the spool 314 of the valve 98 to the leftmost position in FIG. 2. At this time, the hydraulic pressure in the fluid chamber of the rear clutch 26 is exhausted from a fluid outlet 372 of the rear clutch control valve 88 to immediately release the rear clutch 26, and the hydraulic pressure in the fluid chamber of the front clutch 24 and the fluid chamber 360 of the kickdown brake 30 is exhausted from a fluid outlet 374 of the 2nd-3rd and 4th-3rd speed shift valve 98 through an orifice 376 thereby releasing the front clutch 24 and engaging the kickdown brake 30. As in the speed shift from the 1st to 2nd speed ratio or from the 2nd to 3rd speed ratio described above, the hydraulic pressure control valve 92 operates to reduce the hydraulic pressure in the fluid passage 216 for a short time during the speed shift thereby reducing the engaging hydraulic pressure in the fluid chamber 344 of the kickdown brake 30 for smooth engagement. Then, the hydraulic pressure increases to 6 kg/cm² to achieve the speed shift to the 4th speed ratio. If the auxiliary switch is set to the D3 position, the speed shift is achieved from the 1st through 3rd speed ratios, and the speed shift to the 4th speed ratio is not achieved.

Down-shift operation of the transmission system according to the present invention will now be described. In this case, the change-over operation of the hydraulic pressure is the reverse of the up-shift operation described above. When both the electromagnetic valves 102 and 104 are de-energized for speed shift from the 4th speed ratio to the 3rd speed ratio by the instruction from the electronic control device 108, the line pressure in the fluid passage 366 is exhausted. In the rear clutch control valve 88, at this time, the line pressure from the fluid passage 330 is acting on the leftside pressure receiving surface of the land 274. Since the hydraulic pressure control valve 92 operates to reduce the hydraulic pressure in the fluid passage 216 as in the case of up-shift described above, the spool 272 alone moves to the leftmost position to exhaust the hydraulic pressure in the fluid passage 370, and the spool 314 of the 2nd-3rd and 4th-3rd speed shift valve 98 moves to the rightmost position. Thus, the hydraulic pressure from the fluid passage 342 is smoothly supplied to the fluid chamber 360 of the kickdown brake 30 and the front clutch 24 through the fluid passage 354. Upon approximate completion of the releasing of the kickdown brake 30 and the engagement of the front clutch 24, the operation of the hydraulic pressure control valve 92 is stopped and the hydraulic pressure in the fluid passage 216 increases. As a result, the spool 284 of the rear clutch control valve 88 is moved to the leftmost position, and the line pressure from the fluid passage 330 is supplied to the rear clutch 26 through the fluid passage 332 to engage the clutch 26 thereby achieving the speed shift to the 3rd speed ratio.

The reason why the engagement of the rear clutch 26 is made later than that of the front clutch 24 is to reduce a possible large shift shock caused by first engaging the rear clutch 26 having a larger torque capacity.

In the speed shift from the 3rd speed ratio to the 2nd speed ratio, the electromagnetic valve 102 is de-energized and the electromagnetic valve 104 is energized to exhaust the hydraulic pressure in the fluid passage 360. The spool 316 of the 4th speed clutch control valve 100 is moved to the rightmost position to exhaust the hydraulic pressure in the fluid passage 364 through the fluid passage 366. Also, the spool 314 of the 4th-3rd speed shift valve 98 is moved to the leftmost position to exhaust the hydraulic pressure in the fluid passage 354. Thus, the 4th speed clutch 28 and the front clutch 24 are released and the kickdown brake 30 is engaged thereby achieving the speed shift to the 2nd speed ratio. Also in this speed shift, the hydraulic pressure control valve 92 operates to smoothly engage the kickdown brake 30 thereby preventing the speed shift shock.

In the speed shift from the 2nd speed ratio to the 1st speed ratio, both the electromagnetic valves 102 and 104 are in the energized state. The spools 218 and 220 of the shift control valve 86 are moved to the leftmost position to exhaust the hydraulic pressure in the fluid passage 340. The spool 308 of the 1st-2nd speed shift valve 96 and the spool 316 of the 4th speed clutch control valve 104 are moved to the leftmost position. Thus, the hydraulic pressure in the fluid chamber 344 of the kickdown brake 30 is exhausted to release the brake 30 thereby achieving the speed shift to the 1st speed ratio, together with the function of the one-way clutch 34.

When the spool 85 of the manual valve 154 is set to the 2 position, the same speed shift as with the D position described above is made between the 1st speed ratio and the 2nd speed ratio.

When the spool 85 of the manual valve 154 is set to the L position, the line pressure is introduced to the fluid chamber of the rear clutch 26 as in the speed shift to the 1st speed ratio with the D position of the manual valve 154. A signal dictating that the selector lever (not shown) is set to the L position is inputted from the select position sensor 144 to the electronic control device 108, and the electronic control device 108 outputs an instruction to cut off current to the electromagnetic valve 106 so that the duty ratio of the electromagnetic valve 106 is 0%, that is, a state in which the orifice 114 is fully closed. As a result, the spool 212 of the hydraulic pressure control valve 92 is moved rightward in FIG. 2. The line pressure in the fluid passage 150 is supplied to the low reverse brake 32 through the fluid passage 216, 1st-2nd speed shift valve 96 and the fluid passage 334 thereby engaging the low reverse brake 32. Thus, the driving force from the drive shaft 64 is transmitted to the input shaft 20, that is, engine brake functions, thereby achieving the speed shift to the 1st speed ratio.

When the spool 85 of the manual valve 84 is set to the R position, the fluid 148 communicates with the fluid passages 156 and 158. The fluid passage 158 communicates with the low reverse brake 32 through the N-R control valve 90, fluid passage 204, the 1st-2nd speed shift valve 96 and the fluid passage 334. The fluid passage 156 communicates with the front clutch 24 through the select valve 362. Thus, the front clutch 24 and the low reverse brake 32 are engaged thereby achieving the reverse speed ratio. Also in this case, the electromagnetic valve 106 operates for a short time during the speed shift as in the speed shift to the forward speed ratios to maintain the hydraulic pressure supplied to the low reverse brake 32 to a reduced value thereby preventing the shift shock.

Figure 3A:
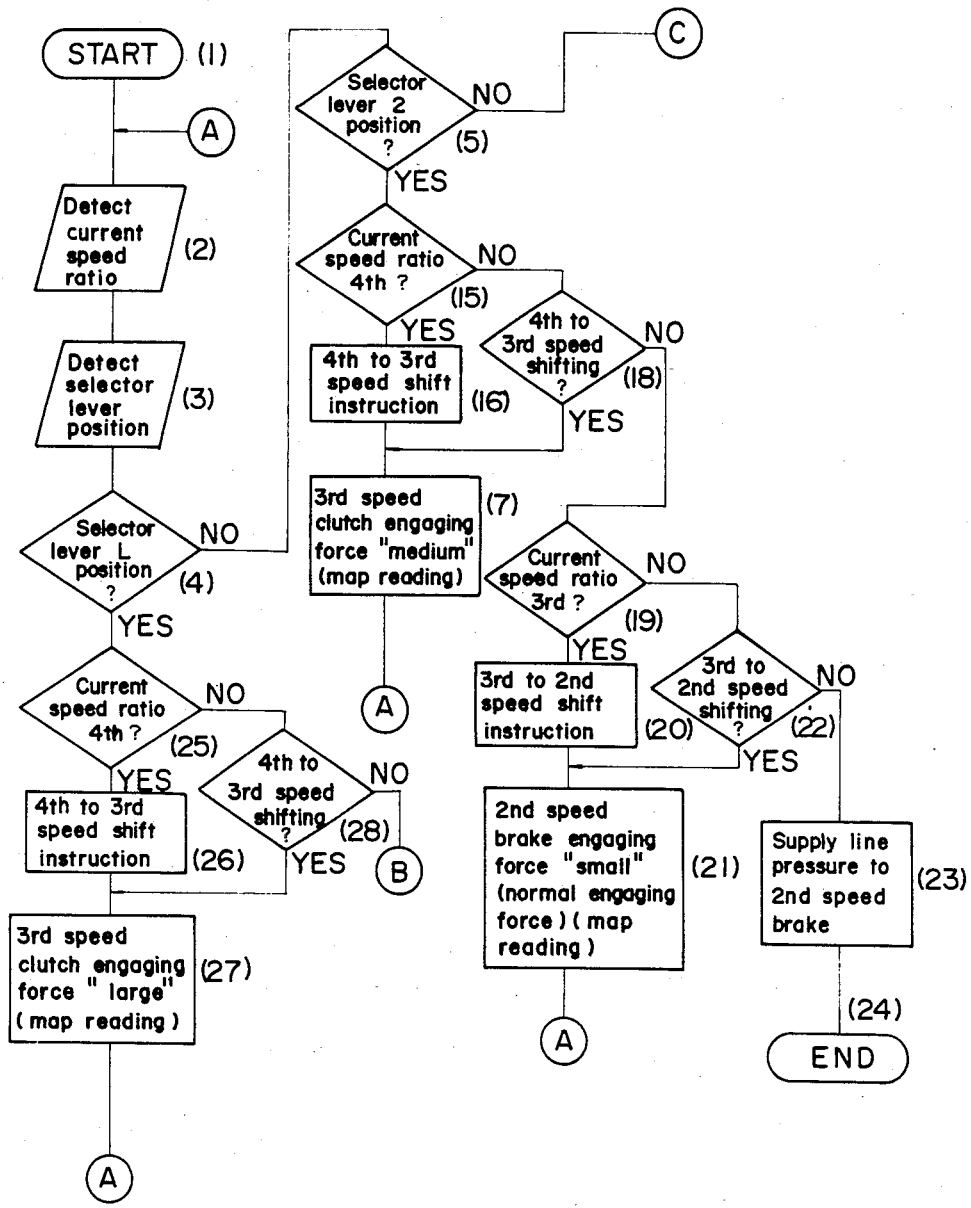

The down-shift operation is achieved by controlling the electromagnetic valves 102, 104 and 106 by the electric control device 108 according to the control process shown in FIG. 3 in dependence on signals from various sensors.

When a state requiring down-shift is detected by the electric control device 108, a start processing (1) of the program in FIG. 3 is executed. After the execution of the start processing (1), a current speed ratio detection processing (2) to detect the currently achieved speed ratio and a selector lever position detection processing (3) to detect the current position of the selector lever.

Based on the signal detected in the processing (3) above, a selector lever L position judgment processing (4) to judge as to whether or not the selector lever is set to the L position, a selector lever 2 position judgment processing (5) to judge as to whether or not the selector lever is set to the 2 position, and an auxiliary switch OFF judgment processing (6) to judge as to whether or not the auxiliary switch is set off can be executed. When the results of all the judgment processings are "No", that is, when the shift lever is set to the D position and the auxiliary is set on in spite of the output of a down-shift signal, a normal speed shift control processing (7) to make the normal down-shift control operation is executed, and then a program end processing (8) is executed thereby finishing the program.

On the other hand, when the result of the auxiliary switch OFF judgment processing (6) is "Yes", a current 4th speed ratio judgment processing (9) to judge as to whether or not the currently achieved speed ratio is the 4th speed ratio is executed. When the result of the current 4th speed ratio judgment processing (9) is "Yes", a 4th-3rd speed shift processing (10) is executed to output a signal to instruct a shift from the 4th speed ratio to the 3rd speed ratio to the electromagnetic valves 102 and 104. Then, a 3rd speed clutch engaging force "small" processing (11) is executed to output a signal to duty-control the electromagnetic valve 106 according to a map storing the duty ratios so that the hydraulic pressure to decrease the engaging force of the clutch to achieve the 3rd speed ratio (front clutch 24) to a reduce value, which is the same as for normal speed shift from the 4th speed ratio to the 3rd speed ratio, during the speed shift from the 4th speed ratio to the 3rd speed ratio, and then the processing operation returns to the processing (2). When the result of the judgment processing (9) is "No", a 4th-3rd speed shift judgment processing (12) to judge as to whether or not the speed shift is currently being made from the 4th speed ratio to the 3rd speed ratio is executed. When the result of the processing (12) is "No", that is, the speed shift is completed and the 3rd speed is achieved, a 3rd speed clutch line pressure supply processing (13) to output a signal to duty-control the electromagnetic valve 106 so that the line pressure is supplied to the front clutch 24 (duty ratio 0%=stop), and then a program end processing (14) is executed to finish the program. When the result of the processing (12) is "Yes", that is, the speed shift is being made, the processing (11) is executed.

When the selector lever is set to the 2 position and the result of the processing (5) is "Yes", a current 4th speed ratio judgment processing (15) to judge as to whether or not the currently achieved speed ratio is the 4th speed ratio is executed. When the result of the current 4th speed ratio judgment processing (15) is "Yes", a 4th-3rd speed shift processing (16) to output a signal S43 to instruct the speed shift from from the 4th speed ratio to the 3rd speed ratio is executed as in the processing (10) above. Then, a 3rd speed clutch engaging force "medium" processing (17) is executed to output a signal to duty-control the electromagnetic valve 106 at a duty ratio DA ($<$D0) so that a hydraulic pressure to increase the engaging force of the front clutch 24 during the shift from the 4th speed ratio to the 3rd speed ratio to a value greater than that for the normal speed shift (a hydraulic pressure higher than that supplied to the front clutch 24 in the processing (11)), and then the processing operation returns to the processing (2). When the result of the processing (15) is "No", a 4th-3rd speed shift judgment processing (18) which is quite same as the processing (12) is executed. When the result of the processing (18) is "Yes", that is, the speed shift is being made, the processing (17) and after are executed. When the result is "No", a current 3rd speed ratio judgment processing (19) to judge as to whether or not the currently achieved speed ratio is the 3rd speed ratio is executed. When the result of the processing (19) is "Yes", that is, the 3rd speed ratio is currently achieved, a 3rd-2nd speed shift processing (20) is executed to output a signal S32 to instruct a speed shift from the 3rd speed ratio to the 2nd speed ratio to the electromagnetic valves 102 and 104. Then, a 2nd speed brake engaging force "small" processing (21) is executed to output a signal to duty-control the electromagnetic valve 106 at a duty ratio DB (=D1) so that a hydraulic pressure to decrease the engaging force of the brake to achieve the 2nd speed ratio (kickdown brake 30) during the speed shift from the 3rd speed ratio to the 2nd speed ratio to a reduced value is supplied to the engaging-side fluid chamber 344 of the kickdown brake 30 as in the case of normal speed shift from the 3rd speed ratio to the 2nd speed ratio, then the processing operation returns to the processing (2). When the result of the processing (19) is "No", that is, the currently achieved speed ratio is not the 3rd speed ratio, a 3rd-2nd speed shift judgment processing (22) is executed to judge as to whether or not the speed shift is being made from the 3rd speed ratio to the 2nd speed ratio. When the result of the processing (22) is "Yes", the processing operation returns to the 2nd speed brake engaging force "small" processing (21). When the result is "Yes", it is determined that the 3rd-2nd speed shift is completed and the 2nd speed ratio is achieved, and a 2nd speed brake line pressure supply processing (23) is executed to output a signal to control the electromagnetic valve 106 so that the line pressure is supplied to the engaging-side fluid chamber 344 of the kickdown brake 30. Then, a program end processing (24) is executed to finish the program.

When the selector lever is set to the L position and the result of the selector lever L position judgment processing (4) is "Yes", a current 4th speed ratio judgment processing (25) is executed to judge as to whether or not the currently acieved speed ratio is the 4th speed ratio. When the result of the processing (25) is "Yes", that is, the 4th speed ratio is currently achieved, a 4th-3rd speed shift instruction processing (26) is executed to output a signal S43 to instruct a speed shift from the 4th speed ratio to the 3rd speed ratio to the electromagnetic valves 102 and 104. Then, a 3rd speed clutch engaging force "large" processing (27) is executed to output a signal to duty-control the electromagnetic valve 106 at a duty ratio D'A ($<$D'0) according to the duty ratio memory map so that a hydraulic pressure to increase the engaging force of the front clutch 24 during the speed shift from the 4th speed ratio to the 3rd speed ratio to a value greater than that obtained by the processing (17) (a higher hydraulic pressure than that supplied to the front clutch 24 in the processing (17)) is supplied to the front clutch 24, then the processing operation returns to the processing (2). On the other hand, when the result of the processing (25) is "No", that is, the currently achieved speed ratio is other than the 4th speed ratio, a 4th-3rd speed shift judgment processing (28) is executed to judge as to whether or not the speed shift is being made from the 4th speed ratio to the 3rd speed ratio. When the result of the processing (28) is "Yes", the processing (27) is executed to maintain the engaging force of the front clutch 24 at the increased value. When the result of the processing (28) is "No", a current 3rd speed ratio judgment processing (29) is executed to judge as to whether or not the current speed ratio is the 3rd speed ratio. When the result of the processing (29) is Yes", that is, the 3rd speed is currently achieved, a 3rd-2nd speed shift instruction processing (30) is executed to output a signal S'32 to instruct a speed shift from the 3rd speed ratio to the 2nd speed ratio to the electromagnetic valves 102 and 104. Then, a 2nd speed brake engaging force "large" processing (31) is executed to output a signal to duty-control the electromagnetic valve 106 at a duty ratio D'B (D'1) according to the duty ratio memory map so that a hydraulic pressure to increase the engaging force of the kickdown brake 30 during the speed shift from the 3rd speed ratio to the 2nd speed ratio to a value greater than that in the normal speed shift from the 3rd speed ratio to the 2nd speed ratio is supplied to the engaging-side fluid chamber 344 of the kickdown brake 30, then the processing operation returns to the processing (2). When the result of the processing (29) is "No", that is, the currently achieved speed ratio is not the 3rd speed ratio, a 3rd-2nd speed shift judgment processing (32) is executed to judge as to whether or not the speed shift is being made from the 3rd speed ratio to the 2nd speed ratio. When the result of the processing (32) is "Yes", the processing operation returns to the 2nd speed brake engaging force "large" processing (29). When the result is "No", a current 2nd speed ratio judgment processing (33) is executed to judge as to whether or nor the current speed ratio is the 2nd speed ratio. When the result of the processing (33) is "Yes", a 2nd-1-st speed shift instruction processing (34) is executed to output a signal S'21 to instruct a speed shift from the 2nd speed ratio to the 1st speed ratio to the electromagnetic valves 102 and 104. Then, a 1st speed brake engaging force "normal" processing (35) is executed to output a signal to duty-control the electromagnetic valve 106 at a duty ratio D'C (=D'2) according to the duty ratio memory map so that a hydraulic pressure same as for the normal 2nd-1st speed shift to the low reverse brake 32, then the processing operation returns to the processing (2). When the result of the processing (33) is "No", that is, the currently achieved speed ratio is not the 2nd speed ratio, a 2nd-1st speed shift judgment processing (36) is executed to judge as to whether or not the speed shift is being made from the 2nd speed ratio to the 1st speed ratio. When the result of the processing (36) is "Yes", the processing operation returns to the 1st speed brake engaging force "normal" processing (35). When the result is "No", it is determined that the 1st speed ratio is achieved, and a 1st speed brake line pressure supply processing (37) is executed to output a signal to control the electromagnetic valve 106 so that the line pressure is supplied to the low reverse brake 32. Then, a program end processing (38) is executed to finish the program.

Figure 4A:
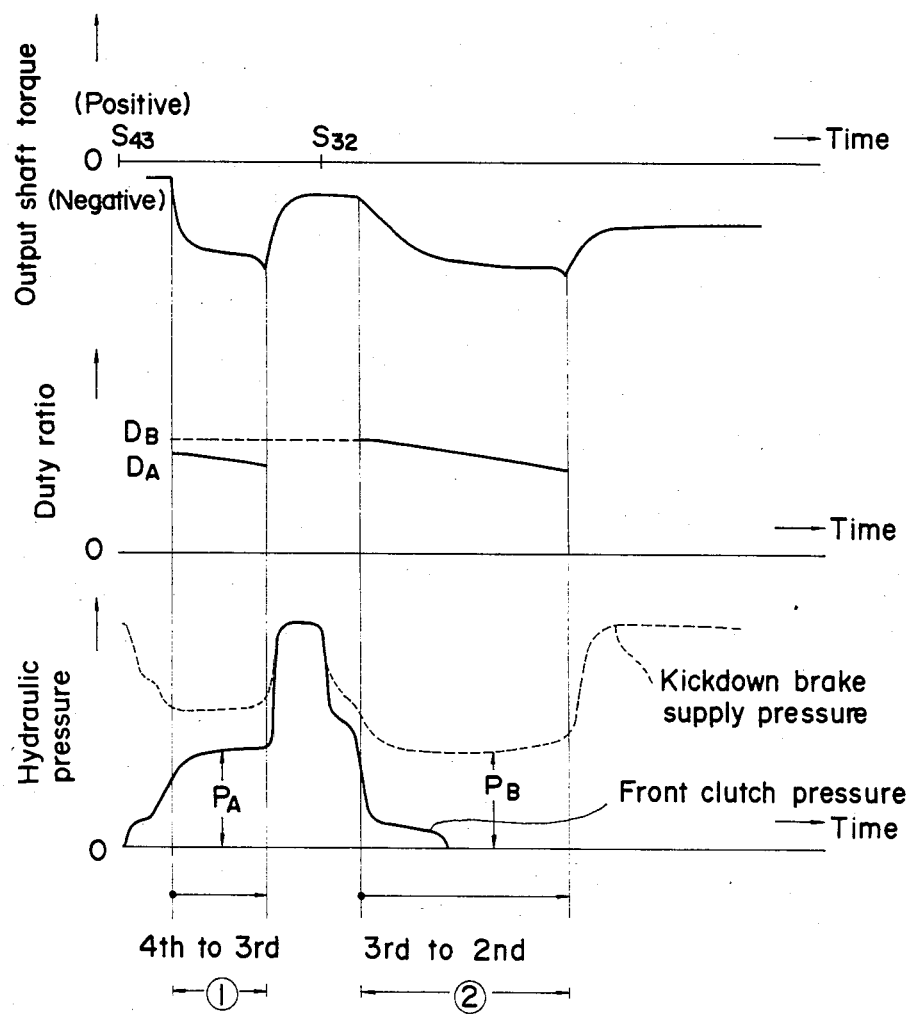
FIGS. 4(a) and 4(b) are a curve showing variation in output shaft torque, duty ratio, and hydraulic pressure with time during speed shift of the automatic transmission system for vehicle according to the present invention.

Variation in the output shaft torque with time of the transmission of the vehicle running with the 4th speed ratio, when the selector lever is turned from the D position to the 2 position with the auxiliary switch set ON to execute a 4th-to-2nd speed shift is executed, and when the selector lever is turned from the D position to the L position with the auxiliary switch set ON to execute a 4th-to-1st speed shift, will now be described with reference to FIGS. 4(a) and (b) and in relation to the program in FIG. 3.

In the vehicle running with the 4th speed ratio, when the selector lever is turned from the D position with the auxiliary switch set ON to the 2 position, the electronic control device 108 outputs a down-shift instruction signal to start the program shown in FIG. 3. The processings (1)-(2)-(3)-(4) (5)-(15) are executed, then the 4th-3rd speed shift instruction processing (16) (S43 in FIG. 4(a)) is executed to turn off the electromagnetic valves 102 and 104 to achieve the speed shift from the 4th speed ratio to the 3rd speed ratio. Then, the 3rd speed clutch engaging force "medium" processing (17) (supply hydraulic pressure PA (>P0) is executed (area (1) in FIG. 4(a)). The front clutch 24 is engaged earlier than normal, and the output shaft torque decreases rapidly thereby obtaining a greater engine braking effect (a strong negative output shaft torque) than with normal speed shift. Then the processing operation returns to the processing (2), and the processings (3)-(4)-(5)-(15)-(18) are executed. When the result of the processing (18) is "Yes", that is, the 4th-to-3rd speed shift is still being made, the processing is made to maintain the engaging force of the 3rd speed clutch at "medium" until the 3rd speed ratio is achieved. When the result of the processing (18) is "No", that is, the 4th-to-3rd speed shift is completed, the processings (19)-(20) are executed to output the 3rd-2nd speed shift instruction (S32 in FIG. 4(a)) turning OFF the electromagnetic valve 102 and turning ON the electromagnetic valve 104 to achieve the speed shift from the 3rd speed ratio to the 2nd speed ratio. The 2nd speed brake engaging force "small" processing (21) (supply hydraulic pressure PB (=P1) is executed to engage the 2nd speed brake with the normal engaging force (area (2) in FIG. 4(a)), and then the processings (2)-(3)-(4)-(5)-(15)-(18)-(19)-(22) are executed again. When the result of the processing (22) is "Yes", that is, the 3rd-to-2nd speed shift is still being made, the processing is executed to maintain the engaging force of the 2nd speed brake at the "small" value until the 2nd speed ratio is achieved. When the result of the processing (22) is "No", that is, the 3rd-to-2nd speed shift is completed, the processings (23)-(24) are executed to complete the 4th-to-2nd speed shift.

In the vehicle running with the 4th speed ratio, when the selector lever is turned from the D position with the auxiliary switch set ON to the L position, the electronic control device 108 outputs a down-shift instruction signal to start the program shown in FIG. 3. The processings (1)-(2)-(3)-(4)-(25) are executed, and then the 4th-3rd speed shift instruction processing (26) (S'43 in FIG. 4(b)) is executed to turn OFF the electromagnetic valves 102 and 104 in order to achieve the 4th-to-3rd speed shift. The 3rd speed clutch engaging force "large" processing (27) (supply hydraulic pressure P'A (>P'0) is executed (area (1) in FIG. 4(b)). The front clutch 24 is engaged more rapidly than in the 4th-to-3rd speed shift of the above 4th-to-2nd speed shift, and the output shaft torque decreases further thereby obtaining a greater engine braking effect (a stronger negative output shaft torque). Then, the processings (2)-(3)-(4)-(25)-(28) are executed. When the result of the processing (28) is "Yes", that is, the 4th-to-3rd speed shift is still being made, the processing is executed to maintain the engaging force of the 3rd speed clutch at the "large" value until the 3rd speed ratio is achieved. When the result of the processing (28) is "No", that is, the 4th-to-3rd speed shift is completed, the processings (29)-(30) are executed to output the 3rd-2nd speed shift instruction (S'32 in FIG. 4(b)) turning OFF the electromagnetic valve 102 aand turning ON the electromagnetic valve 104.

Figure 4B:
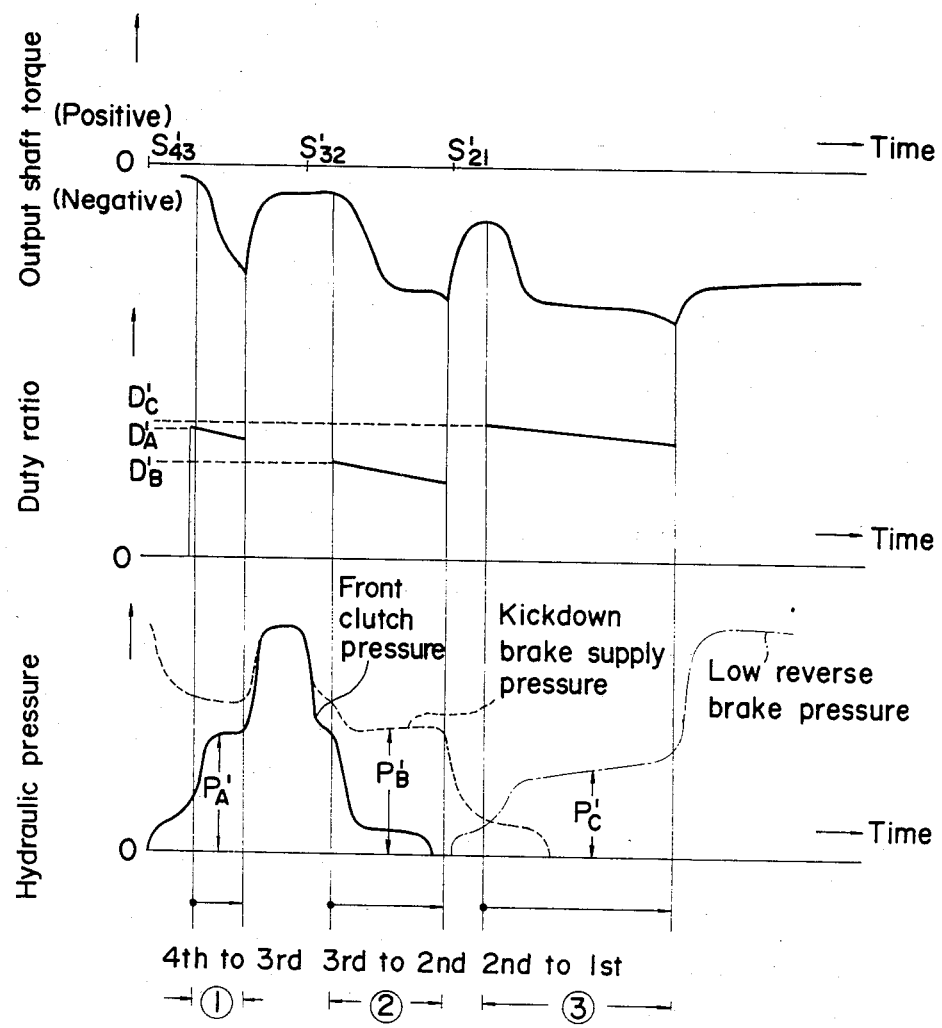
Figure 5A:
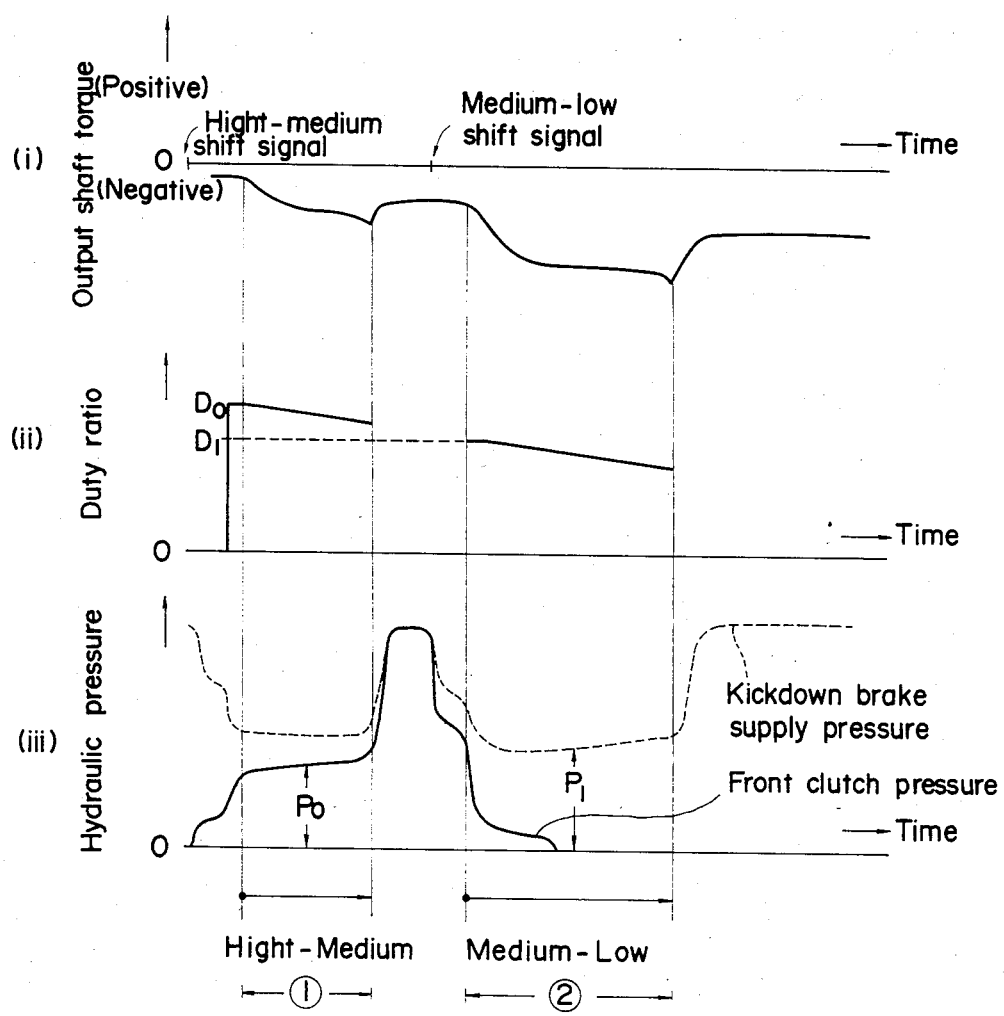
FIGS. 5(a) and 5(b) are a curve showing variation in output shaft torque, duty ratio, and hydraulic pressure with time during speed shift of a conventional art automatic transmission system for vehicle.
Figure 5B:
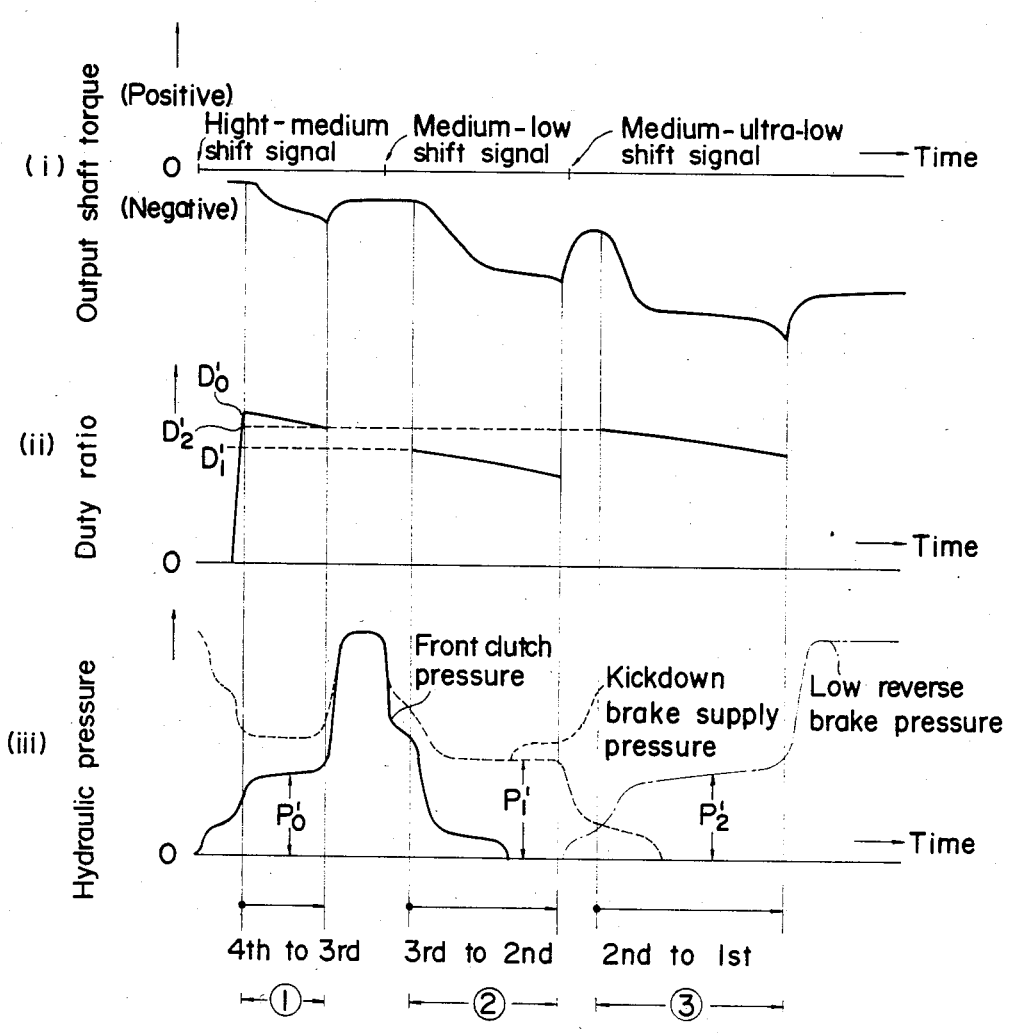

The 2nd speed brake engaging force "large" processing (31) (supply hydraulic pressure P'B (>P'1) is executed (area (2) in FIG. 4(b)). The kickdown brake 30 is engaged earlier than in the normal speed shift thereby obtaining a greater engine braking effect than the normal 3rd-to-2nd speed shift (a stronger negative output shaft torque).

The processing operation returns to the processing (2), and the processings (3)-(4)-(25)-(28)-(29)-(32) are executed. When the result of the processing (32) is "Yes", that is, the 3rd-to-2nd speed shift is still being made, the processing is executed to maintain the engaging force of the 2nd speed brake at the "large" value until the 2nd speed ratio is achieved. When the result of the processing (32) is "No", that is, the 3rd-to-2nd speed shift is completed, the processings (33)-(34) are executed to output the 2nd-1st speed shift instruction (S'21 in FIG. 4(b)) turning ON the electromagnetic valves 102 and 104. The the 1st speed brake engaging force "normal" processing (35) is executed to engage the 1st speed brake at the normal engaging force (area (3) in FIG. 4(b)), and then the processings (2)-(3)-(4)-(25)-(28)-(29)-(32)-(33)-(36) are executed again. When the result of the processing (36) is "Yes", that is, the 2nd-to-1st speed shift is still being made, the processing is executed to maintain the engaging force of the 1st speed brake at the normal value until the 1st speed ratio is achieved. When the result of the processing (36) is "No", that is, the 2nd-to-2st speed shift is completed, the processings (37)-(38) are executed to complete the 4th-to-1st speed shift.

In the vehicle running with the 3rd speed ratio, when the select lever is turned from the D position with the auxiliary switch set OFF to the L position, the electronic control device 108 output the down-shift signal to start the program in FIG. 3. The processings (1)-(2)-(3)-(4)-(25)-(28)-(29)-(30) are first executed, and thereafter the same processings as in the 4th-to-1st speed shift are executed to complete the 3rd-to-1st speed shift.

By virtue of the arrangement of the embodiment according to the present invention having the control process in the hydraulic pressure control device and the electronic control device, the following effects are provided.

(a) In the down-shift operation from the 4th speed ratio immediately to the 2nd speed ratio, an enhanced engine braking effect is obtained in the speed shift from the 4th speed ratio to the 3rd speed ratio which is greater than that obtained in the normal speed shift from the 4th speed ratio to the 3rd speed ratio. Thus, the driver of the vehicle can immediately obtain the engine braking effect of the expected strength, and the driver feels as if the 4th-2nd speed shift is completed immediately thereby eliminating uneasiness of the driver on the effect of engine brake.

(b) Similarly, in the down-shift operation from the 4th speed ratio immediately to the 1st speed ratio, an enhanced engine braking effect is obtained in the speed shift from the 4th speed ratio to the 3rd speed ratio which is greater than that obtained in the normal speed shift from the 4th speed ratio to the 3rd speed ratio. Also, an enhanced engine braking effect is obtained in the speed shift from the 3rd speed ratio to the 2nd speed ratio which is greater than that obtained in the normal speed shift from the 3rd speed ratio to the 2nd speed ratio. Thus, the driver of the vehicle can immediately obtain the engine braking effect of the expected strength, and the driver feels as if the engine braking effect to be obtained with the 1st speed ratio is achieved with no substantial variation in the output shaft torque thereby eliminating uneasiness of the driver on the effect of engine brake.

(c) For the 4th-to-3rd speed shift in the 4th-to-2nd speed shift, the engaging force of the 3rd speed clutch (front clutch 24) is set to a greater value than that for the normal 4th-to-3rd speed shift, thereby reducing time for achieving the complete engagement of the clutch, hence, time for achieving the 4th-to-2nd speed shift.

(d) Similarly, for the 4th-to-3rd speed shift and the 3rd-to-2nd speed shift in the 4th-to-1st speed shift, the engaging forces for the individual frictional engaging elements (front clutch 24 and kickdown brake 30) are set to greater values than those for the normal 4-th-to-3rd speed shift and 3rd-to-2nd speed shift, respectively, thereby reducing time for achieving complete engagement of the frictional engaging elements, hence, time for achieving the 4th-to-1st speed shift.

(e) The effects of (a), (b), (c) and (d) above can be obtained by simply modifying the program of the electronic control device with no change in the power train or hydraulic circuits.

As can be seen from the above description, with the automatic transmission system according to the present invention having high, medium and low speed ratios, when the speed ratio is to be shifted from the high speed ratio immediately to the low speed ratio, since a greater engine braking effect is obtained during the shift from the high speed ratio to the medium speed ratio than in the normal speed shift from the high speed ratio to the low speed ratio, the driver can obtain the engine braking effect of the expected strength with no time delay. At the same time, the driver of the vehicle feels as if the speed shift from the high speed ratio to the low speed ratio is completed immediately, and time for achieving the speed shift from the high speed ratio to the low speed ratio can be reduced.

Similarly, with the automatic transmission system according to the present invention having high, medium, low and extra-low speed ratios, when the speed ratio is to be shifted from the high speed ratio immediately to the extra-low speed ratio, since an enhanced engine braking effect is obtained in the speed shift from the high speed ratio to the medium speed ratio which is greater than that obtained in the normal speed shift from the high speed ratio to the medium speed ratio, and an enhanced engine braking effect is obtained in the speed shift from the medium speed ratio to the low speed ratio which is greater than that obtained in the normal speed shift from the medium speed ratio to the low speed ratio, the driver can obtain the engine braking effect of the expected strength with no time delay, thereby eliminating uneasiness of the driver on the effect of engine brake. Also, the driver can feel as if the engine braking effect of the sufficient strength is achieved immediately with no substantial variation in the output shaft torque until achieving the speed shift to the extra-low speed ratio. Further, time for achieving the speed shift can be reduced.

What is claimed is:

1. An automatic transmission system for a vehicle comprising a gear mechanism for providing three speed ratios including high, medium and low speed ratios between an input shaft and an output shaft by selectively engaging a plurality of frictional engaging elements operated by hydraulic pressure, a hydraulic pressure source for generating a predetermined hydraulic pressure, a hydraulic pressure selecting device capable of selectively supplying hydraulic pressure from said hydraulic pressure source to said frictional engaging element to achieve a specific one of said speed ratios, a hydraulic pressure control device for controlling hydraulic pressure to be supplied to said frictional engaging elements to achieve said medium and low speed ratios, respectively, disposed between the said hydraulic pressure source and said frictional engaging elements to achieve said medium and low speed ratios, respectively, and an electronic control device for controlling said hydraulic pressure selecting device and said hydraulic pressure control device, wherein said medium speed ratio is once achieved and then said low speed ratio is achieved when the transmission is to be shifted from said high speed ratio immediately to said low speed ratio, said electronic control device having a first means for controlling said hydraulic pressure control device to produce a first hydraulic pressure supplied to said frictional engaging element to achieve said medium speed ratio when the transmission is to be shifted from said high speed ratio to said medium speed ratio and a second means for controlling said hydraulic pressure control device a second hydraulic pressure higher than said first hydraulic pressure when the transmission is to be shifted from said high speed ratio directly to said low speed ratio.

2. An automatic transmission system for a vehicle as claimed in claim 1, having a control means for instructing a shift to said medium speed ratio or said low speed ratio, and said electronic control device controlling said hydraulic pressure selecting device and said hydraulic pressure control device in dependence on instruction from said control means.

3. An automatic transmission system for a vehicle as claimed in claim 2, wherein said control means comprise a selector lever disposed in the cabin of said vehicle.

4. An automatic transmission system for a vehicle as claimed in claim 2, wheren said hydraulic pressure control device has an electromagnetic valve which is duty-controlled by a constant frequency pulse current having a pulse width which is variable in accordance with a speed shift condition.

5. An automatic transmission system for a vehicle as claimed in claim 4, wherein the duty ratio of said constant frequency pulse current is determined in accordance with a previously stored map in dependence at least on a current speed ratio of said transmission being achieved and a selected position of said control mens instructing a shift to said medium speed ratio of said low speed ratio manually operated by the driver of the vehicle.

6. An automatic transmission system for a vehicle as claimed in claim 1, wherein said electronic control device has a means for detecting a currently achieved speed ratio and another means for detecting a setting position of said control means manually operated by the driver of the vehicle instructing a shift to said medium speed ratio or said low speed ratio, said electronic control device being controlled to produce said second hydraulic pressure supplied to said frictional engaging element to achieve said medium speed ratio when said currently ahiceved speed ratio is said high speed ratio and said control means is set to a position instructing a shift to said low speed ratio.

7. An automatic transmission system for a vehicle comprising a gear mechanism for providing at least four speed ratios including high, medium, low and extra-low speed ratios between an input shaft and an output shaft by selectively engaging a plurality of frictional engaging elements operated by hydraulic pressure, a hydraulic pressure source for generating a predetermined hydraulic pressure, a hydraulic pressure selecting device capable of selectively supplying hydraulic pressure from said hydraulic pressure source to said frictional engaging element to achieve a specific one of said speed ratios, a hydraulic pressure control device for controlling hydraulic pressure supplied to said frictional engaging elements to achieve said medium, low, and extra-low speed ratios, respectively, disposed between said hydraulic pressure souce and said frictional engaging elements to achieve said medium, low, and extra-low speed ratios, respectively, and an electronic control device for controlling said hydraulic pressure selecting device and said hydraulic pressure control device, wherein said medium and low speed ratios are once achieved and then said extra-low speed ratio is achieved when the ransmission is to be shifted from said high speed ratio directly to said extra-low speed ratio, said electronic control device having a first means for controlling said hydraulic pressure control device to produce first hydraulic pressure supplied to said frictional engaging element to achieve said medium speed ratio when the transmission is to be shifted from said high speed ratio to said medium speed ratio and a second hydraulic pressure supplied to said frictional engaging element to achieve said low speed ratio when the transmission is to be shifted from said medium speed ratio to said low speed ratio, and a second means for controlling said hydraulic pressure control device to produce a third hydraulic pressure higher than said first hydraulic pressure and a fourth hydraulic pressure higher than said second hydraulic pressure when the transmission is to be shifted from said high speed ratio directly to said extra-low speed ratio.

8. An automatic transmission system for a vehicle as claimed in claim 7, having a control means for instructing a shift to said medium speed ratio, said low speed ratio, or said extra-low speed ratio, and said electronic control device controlling said hydraulic pressure selecting device and said hydraulic pressure control device in dependence on instruction from said control means.

9. An automatic transmission system for a vehicle as claimed in claim 8, wherein said control means comprises a selector lever disposed in the cabin of said vehicle.

10. An automatic transmission system for a vehicle as claimed in claim 8, wherein said hydraulic pressure control device has an electromagnetic valve which is duty-controlled by a constant frequency pulse current having a pulse width which is variable in accordance with a speed shift condition.

11. An automatic transmission system for a vehicle as claimed in claim 10, wherein the duty ratio of said constant frequency pulse current is determined in accordance with a previously stored map in dependence at least on a current speed ratio of said transmission being achieved and a selected position of said control means instructing a shift to said medium speed ratio or said low speed ratio manually operated by the driver of the vehicle.

12. An automatic transmission system for a vehicle as claimed in claim 7, wherein said electronic control device has a means for detecting a currently achieved speed ratio and another means for detecting a setting position of said control means manually operated by the driver of the vehicle instructing a shift to said medium speed ratio of said low speed ratio, said electronic control device being controlled to produce said third hydraulic pressure supplied to said frictional engaging element to achieve said medium speed ratio and said fourth hydraulic pressure to be supplied to said frictional engaging element to achieve said low-speed ratio during a shift from said medium speed ratio to said low speed ratio when said currently achieved speed ratio is said high speed ratio and said control means is set to a position instructing a shift to said extra-low speed ratio.

* * * * *